United States Patent [19]
Firmin

[11] Patent Number: 6,009,658
[45] Date of Patent: Jan. 4, 2000

[54] TWO HEADED FISH LURE

[75] Inventor: Herman P. Firmin, Baton Rouge, La.

[73] Assignee: Uncle Josh Bait Company, Fort Atkinson, Wis.

[21] Appl. No.: 09/109,584

[22] Filed: Jul. 2, 1998

[51] Int. Cl.[7] .................................................. A01K 85/00
[52] U.S. Cl. ....................... 43/42.24; 43/42.28; 43/42.37
[58] Field of Search .......................... 43/42, 42.24, 42.26, 43/42.27, 42.28, 42.29, 42.3, 42.37, 42.38; D22/126, 127

[56] References Cited

U.S. PATENT DOCUMENTS

| | | | |
|---|---|---|---|
| D. 248,868 | 8/1978 | Williams, Jr. | D22/127 |
| 570,632 | 11/1896 | Hastings | 43/42.28 |
| 1,272,183 | 7/1918 | Arnold | 43/42.29 |
| 1,569,993 | 1/1926 | MacLeod | 43/42.26 |
| 1,611,117 | 12/1926 | Kearns | 43/42.26 |
| 1,921,176 | 8/1933 | Unkefer | 43/42.33 |
| 1,976,695 | 10/1934 | Boehm | 43/42.26 |
| 2,403,759 | 7/1946 | Sabe | 43/42.24 |
| 2,501,723 | 3/1950 | Harvey | 43/42.28 |
| 2,503,672 | 4/1950 | Johnson et al. | 43/42.28 |
| 2,563,825 | 8/1951 | Ebert | 43/42.24 |
| 2,582,418 | 1/1952 | Crowder | 43/42.29 |
| 2,618,095 | 11/1952 | Igo | 43/42.24 |
| 2,741,058 | 4/1956 | Allman | 43/42.24 |
| 3,060,620 | 10/1962 | Binkowski | 43/42.24 |
| 3,260,012 | 7/1966 | Stolzer | 43/42.3 |
| 3,528,189 | 9/1970 | Lilley, Jr. | 43/42.33 |
| 3,940,869 | 3/1976 | Roberts | 43/42.24 |
| 3,964,203 | 6/1976 | Williams, Jr. | 43/42.29 |
| 3,967,406 | 7/1976 | Anderson | 43/42.24 |
| 3,986,291 | 10/1976 | Hopper | 43/42.28 |
| 4,033,063 | 7/1977 | Mize | 43/42.28 |
| 4,177,597 | 12/1979 | Thomassin | 43/42.3 |
| 4,236,342 | 12/1980 | Saia | 43/42.29 |
| 4,307,531 | 12/1981 | Honse | 43/42.24 |
| 4,312,148 | 1/1982 | Hardwicke, III | 43/42.24 |
| 4,429,482 | 2/1984 | Honse | 43/42.24 |
| 4,530,179 | 7/1985 | Larew | 43/42.06 |
| 4,709,501 | 12/1987 | Garst | 43/42.24 |
| 4,771,568 | 9/1988 | Head | 43/42.29 |
| 4,967,505 | 11/1990 | Wulff | 43/42.28 |
| 4,993,183 | 2/1991 | Carver | 43/42.06 |
| 5,117,573 | 6/1992 | Semler | 43/42.28 |
| 5,134,801 | 8/1992 | Davey | 43/42.28 |
| 5,228,230 | 7/1993 | Vaught | 43/42.26 |
| 5,491,927 | 2/1996 | Ortiz | 43/42.28 |
| 5,524,377 | 6/1996 | Freeman et al. | 43/42.3 |
| 5,630,289 | 5/1997 | Dotson | 43/42.28 |
| 5,640,798 | 6/1997 | Garst | 43/42.53 |
| 5,787,634 | 8/1998 | Way | 43/42.26 |
| 5,862,623 | 1/1999 | MacPherson | 43/42.24 |

FOREIGN PATENT DOCUMENTS

| | | | |
|---|---|---|---|
| 537831 | 3/1957 | Canada | 43/42.28 |
| 1038291 | 9/1953 | France | 43/42.28 |
| 2390094 | 1/1979 | France | 43/42.24 |
| 2604056 | 3/1988 | France | 43/42.28 |

*Primary Examiner*—Michael J. Carone
*Assistant Examiner*—Darren W. Ark
*Attorney, Agent, or Firm*—Quarles & Brady LLP

[57] ABSTRACT

The present invention provides a lure that provides a unique undulating motion for attracting fish. The lure is characterized by a body having two heads that when joined together produce a ripple in the body. This causes the lure to undulate when pulled through water. In a preferred form the lure is formed from two halves joined together at a middle point. Each half has a head and a tail. In a non-fishing configuration, the lure body is flat with the heads having an overlapping/crossing relationship. When the heads are joined together in a fishing configuration, a ripple forms in the lure body.

15 Claims, 2 Drawing Sheets

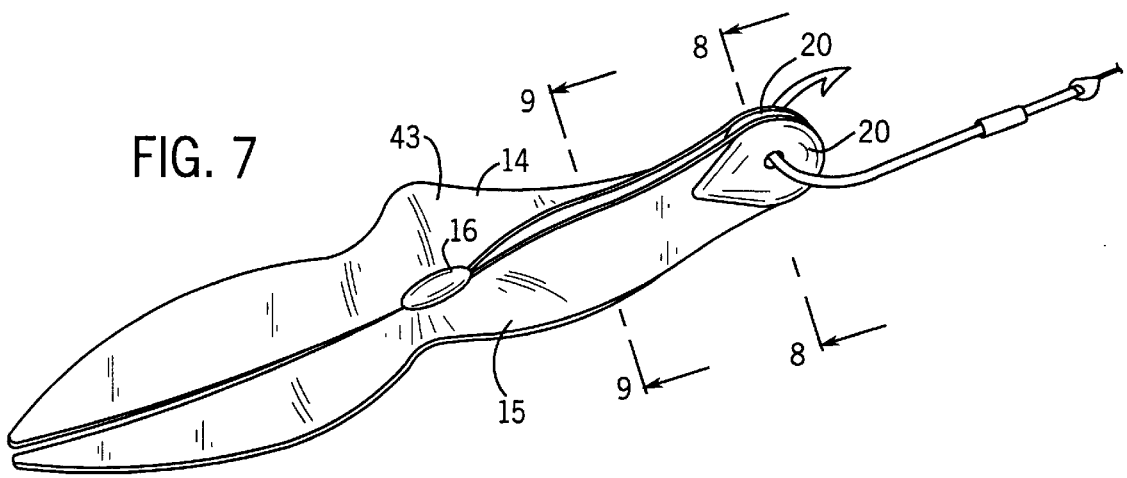
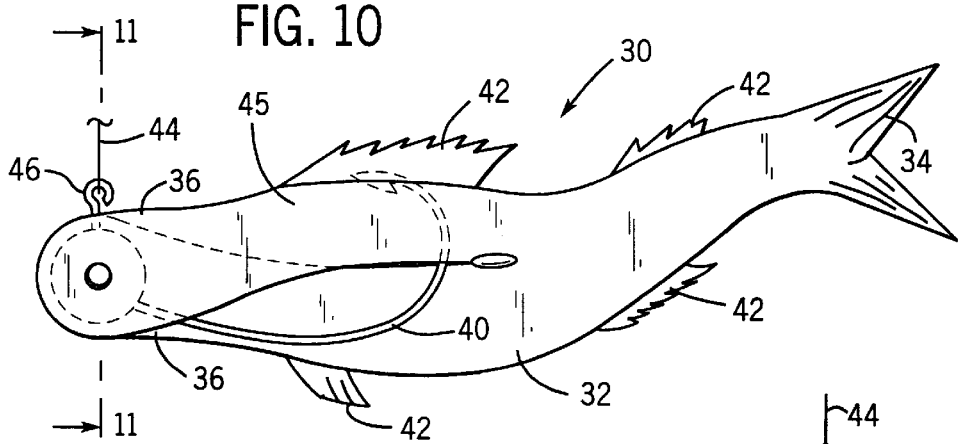
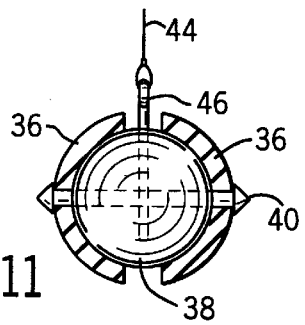

TWO HEADED FISH LURE

CROSS REFERENCES TO RELATED APPLICATIONS

Not Applicable

STATEMENT REGARDING FEDERALLY SPONSORED RESEARCH

Not Applicable

BACKGROUND OF THE INVENTION

The invention relates to fishing lures. More particularly, it relates artificial fishing lures that provide a unique action in the water that is attractive to fish.

Significant efforts have been expended to provide equipment that will facilitate the ability of sport fisherman to catch fish using artificial fishing lures. Early attempts at simulating or improving on live bait took the form of shaping a piece of wood or other material into a shape resembling live bait. The unnatural movement of such lures in the water was a significant disadvantage.

With the development of plastic compositions and injection molding techniques lures were produced that more closely simulated live bait shapes and their movements. Still other lures sought to improve on live baits by providing unique water actions that were particularly attractive to fish. One such lure is disclosed in U.S. Pat. No. 4,709,501. It has dissimilar tail lengths to provide a swimming action designed to attract fish. U.S. Pat. No. 5,640,798 discloses a lure having special fins to provide an enhanced motion for attracting fish.

However, the desire remained to develop still further lures having unique presentations.

BRIEF SUMMARY OF THE INVENTION

The present invention provides a lure having a body with two overlapping heads. When joined together the lure produces a ripple in the body that causes the lure to undulate when pulled through water.

In a preferred embodiment the lure is formed from two halves joined together at a middle point. Each half has a head and a tail. In a non-fishing configuration, the lure body is flat with the heads having an overlapping relationship. When the heads are joined together in a fishing configuration, a ripple forms in the lure body that causes an undulating action when the lure is pulled through the water.

In an alternative aspect, the lure can be viewed to be a foldable element for creating a fishing lure. Preferably, the element has two heads having holes that when aligned receive a hook.

A primary object of the invention is to provide a multi-headed fishing lure that provides an undulation action when pulled through the water.

Another object of the present invention is to provide fishing lure that is easy to manufacture, can be shipped in a secure and flat fashion, and is easy to use.

The foregoing and other objects and advantages of the present invention will be apparent from the description which follows. In the description reference is made to the accompanying drawings which form a part hereof, and in which there is shown by way of illustration preferred embodiments of the invention. However, it is to be understood that the invention is broader than merely the preferred embodiment.

BRIEF DESCRIPTION OF THE DRAWINGS

FIG. 7 is a perspective view of the fishing lure of FIG. 1 (in a head face to head back fishing configuration);

FIG. 8 is a sectional view along line 8—8 of FIG. 7;

FIG. 9 is a sectional view along line 9—9 of FIG. 7;

FIG. 10 is a perspective view of a second embodiment of the present invention; and FIG. 11 is a sectional view along line 11—11 of FIG. 10.

DETAILED DESCRIPTION OF THE PREFERRED EMBODIMENTS

Figure 1:
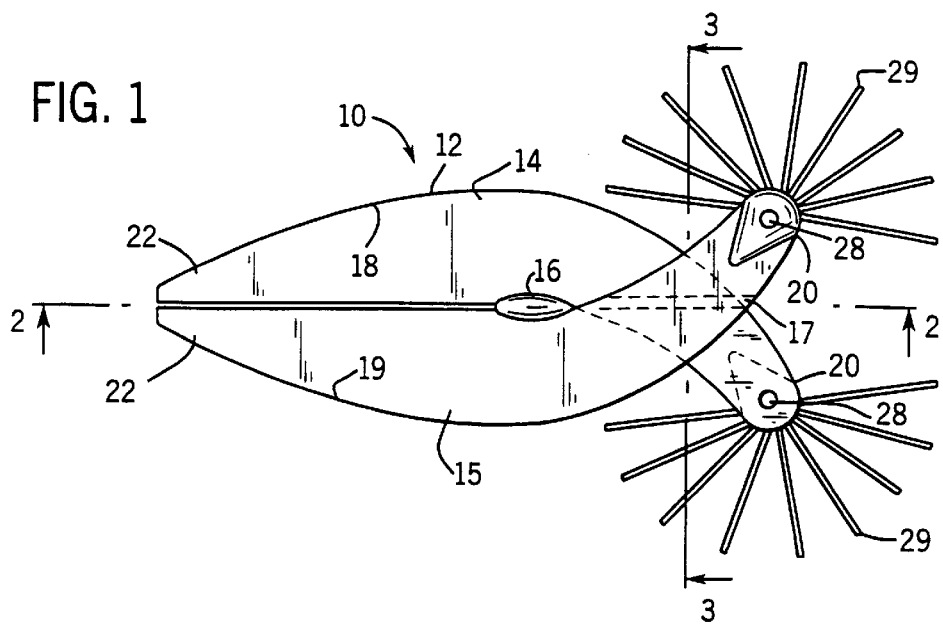
FIG. 1 is a plan view of a fishing lure that incorporates the present invention.
Figure 2:
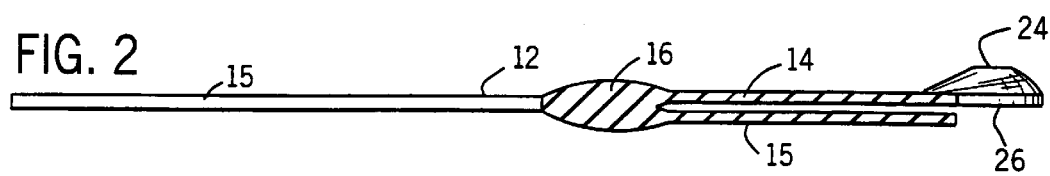
FIG. 2 is a cross sectional view taken along line 2—2.
Figure 3:
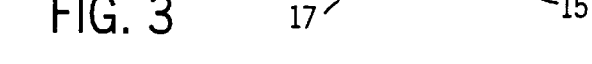
FIG. 3 is a cross sectional view taken along line 3—3.

Shown in FIGS. 1–3 is a fishing lure 10 having a flexible body 12 formed from two generally symmetrical halves 14 and 15 that are joined at a middle point 16. Body 12 is formed from a flexible vinyl plastic material, such as a vinyl plastisol (polyvinyl chloride) dispersion grade resin in a suitable solvent or plasticizer. Techniques for forming plastisol lures are generally described in U.S. Pat. No. 4,530,179.

Each half 14/15 is in the form of an arc 18/19 so as to present a generally elliptically-shaped flat body. Halves 14/15 also have tails 22. The halves 14/15 can also be joined along most of their tails 22 to provide a closer resemblance to a minnow (see FIG. 10).

In the non-fishing configuration shown in FIG. 1 the heads 20 of each half are in an overlapping (crossing with respect to the location of the tail) relationship. A small bead 17 of body material is included forward of the middle point 16 during the manufacturing process to hold to the heads 20 together during packaging and shipping.

The bead 17 discourages the heads 20 from folding over or forming undesirable creases. After retail purchase by a fisherman, heads 20 may be separated by tearing the bead 17. Thereafter, they may be joined as described below. This element for creating a lure is foldable because it is made of a flexible plastic, and requires only simple dies to manufacture.

Figure 4:
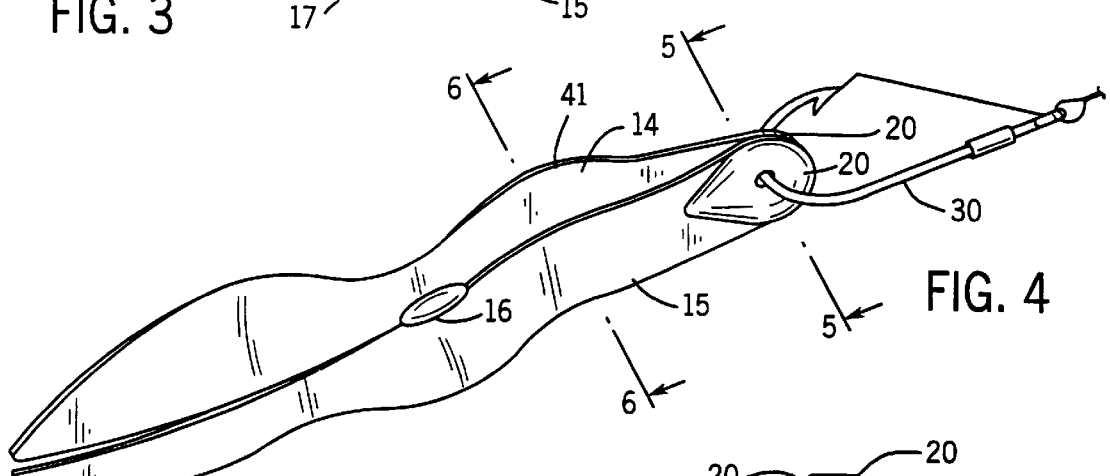
FIG. 4 is a perspective view of the fishing lure of FIG. 1 (in a head back to head back fishing configuration)

Each head 20 has a hole 28 for inserting a hook 30 therethrough so as to form the fishing configurations (e.g. as shown in FIGS. 4 and 7). The heads 20 are thickened to prevent failure (e.g. if the lure is being pulled through water during fishing and a heavy fish bites down on the rear of the lure). The heads 20 have a face 24 and back 26. Hackles/spikes 29 can form an integral part of the heads 20 (to hide the hook 30 from fish).

A life-like fishing configuration is formed by placing the heads 20 back 26 to back 26 and inserting the hook 30 through the hole 28 as shown in FIG. 4, or placing the heads face 24 to back 26 as shown in FIG. 7. Each technique causes a side of the lure to ripple. A third combination (not shown) of face to face abutment may also be used and also creates a ripple.

Figure 6:
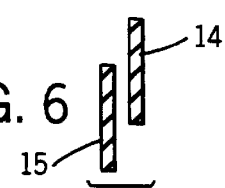
FIG. 6 is a sectional view along line 6—6 of FIG. 4.
Figure 5:
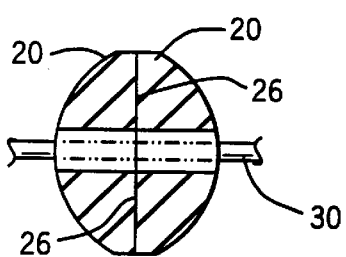
FIG. 5 is a sectional view along line 5—5 of FIG. 4.

In the back to back configuration shown in FIGS. 4–6, there is a slight ripple 41 in the lure body 14 which causes the lure 10 to undulate through the water when pulled by the hook 30. The undulating action provides a unique presentation.

In the face to back configuration shown in FIGS. 7–9, there is a larger ripple 43. This larger ripple creates a more vigorous undulating action.

The idea of joining at least two heads to cause a side ripple (and thus an undulating action by the moving lure in the water) can be incorporated into still other embodiments without departing from the scope of the present invention. For example, in the second embodiment shown in FIG. 10, a fishing lure 30 has a body 32 with a tail 34 and two overlapping heads 36. As shown in FIG. 11, the heads 36 are joined to a weight 38 interposed between the heads 36.

The joined heads 36 form a ripple 45, causing the desired undulating action when pulled through water. A pin 40 extending through the weight 38 projects into each head 36 (joining each head 36 to the weight 38).

Referring back to FIG. 10, a hook 40 forms part of the weight 38 and extends rearward of the heads 36. It is thus partially hidden from view by the lure body 32. The tail 34 is slightly split at the back to resemble a minnow. Preferably fins 42 are formed part of the body 32. This provides a resemblance to a live bait, such as a minnow or eel, as the lure 30 is pulled through the water by a fish line 44 attached to an eye 46 mounted to the weight 38.

What has been described above is merely the preferred embodiments of the invention. Various changes and modifications can be made therein without departing from the scope of the invention defined by the appended claims.

I claim:

1. A fishing lure, comprising:
    a body having two overlapping heads in a crossing position relative to each other, each of which having a hole there through, wherein the holes are not aligned in the crossing position and the heads can be moved to align the holes so as to thereby form a ripple in a side of said body rearward of the holes that will cause an undulating action by said lure when said lure is pulled through water.
2. A fishing lure as in claim 1, wherein said lure is formed from a plastic.
3. A fishing lure as in claim 2, wherein said plastic is plastisol.
4. A fishing lure as in claim 1, wherein both of said heads are joined by a hook inserted through the holes.
5. A fishing lure as in claim 4, wherein said hook extends rearward of said heads.
6. A fishing lure as in claim 1, wherein said heads are joined to a weight.
7. A fishing lure as in claim 1, wherein said body has a tail.
8. A fishing lure as in claim 1, wherein said body has two tails.
9. A fishing lure as in claim 1, wherein said body has fins.
10. A fishing lure as in claim 1, wherein at least one of said heads has integral hackles.
11. A foldable element for creating a fishing lure, comprising:
    a body having two generally mirror image halves, each half having a head and tail, said halves being joined in a crossing fashion at a point disposed between said heads and tails; and
    a hole formed in each of said heads for inserting a hook therethrough, said holes not being aligned when the heads are crossed, and said holes being movable relative to each other;
    wherein when the holes are aligned, a fishing lure results, and a ripple is thereby formed in a side of the resulting lure rearward of the holes.
12. An element as in claim 11, wherein said halves are joined at said point and along at least part of a rear half of the element.
13. An element as in claim 11, wherein said element is formed from a plastic.
14. An element as in claim 13, wherein said plastic is plastisol.
15. An element as in claim 11, wherein at least one of said heads has integral hackles.

* * * * *